Figure 4:
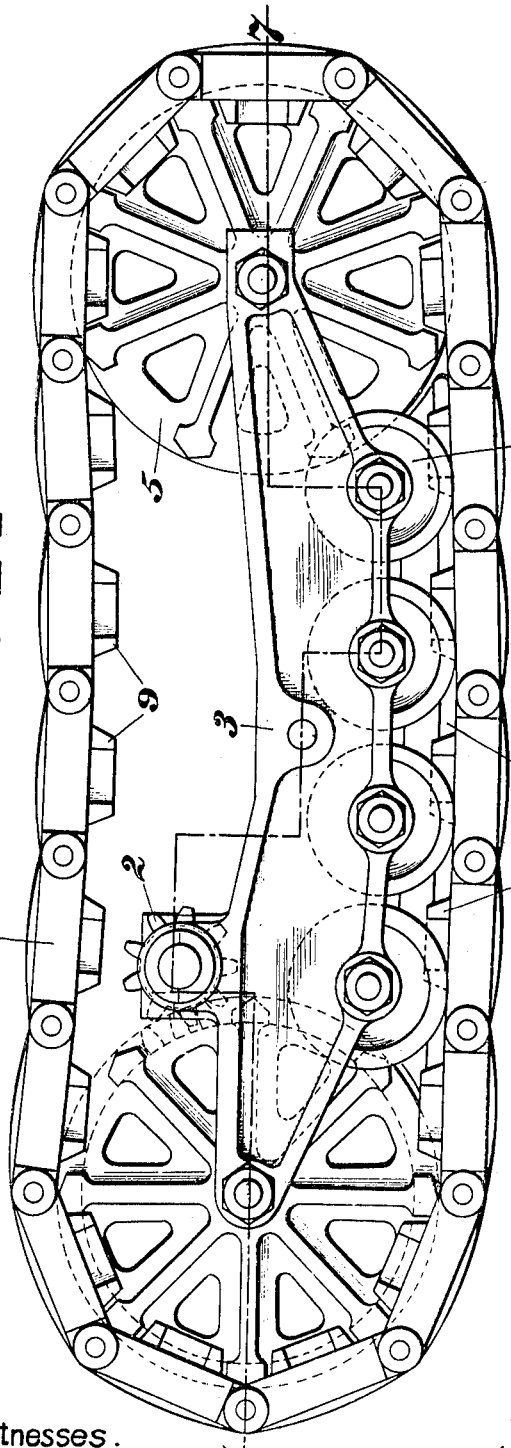

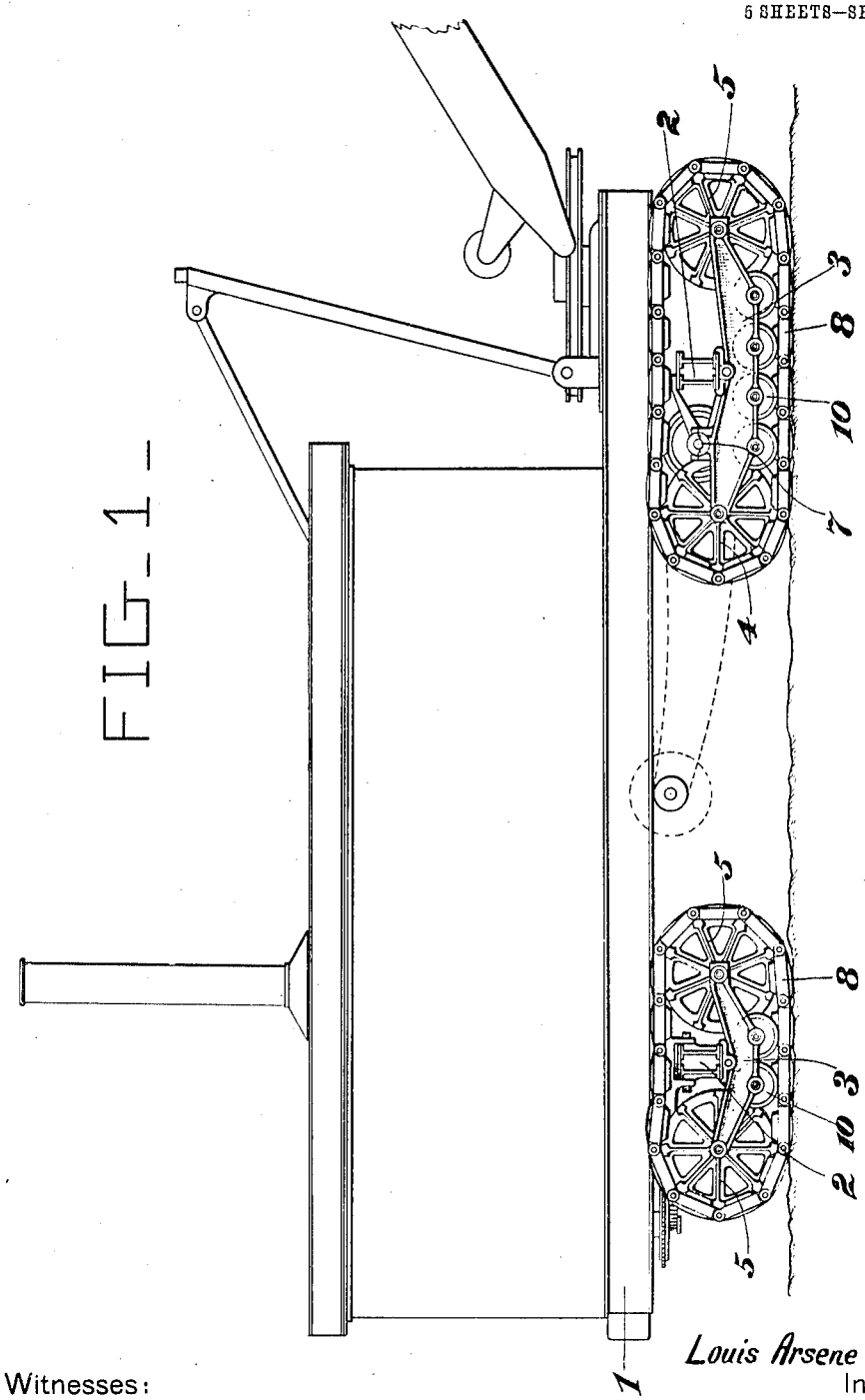

L. A. DÉSY.
EXCAVATOR.
APPLICATION FILED JUNE 3, 1908. RENEWED JULY 9, 1909.
949,354.
Patented Feb. 15, 1910.
5 SHEETS—SHEET 2.
FIG_2_
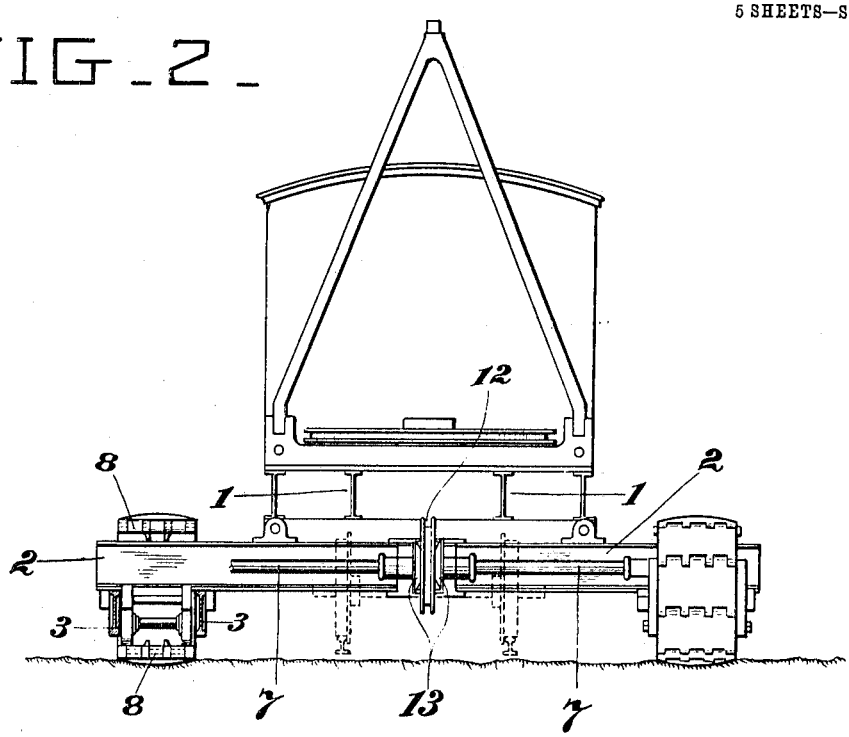
FIG_3_
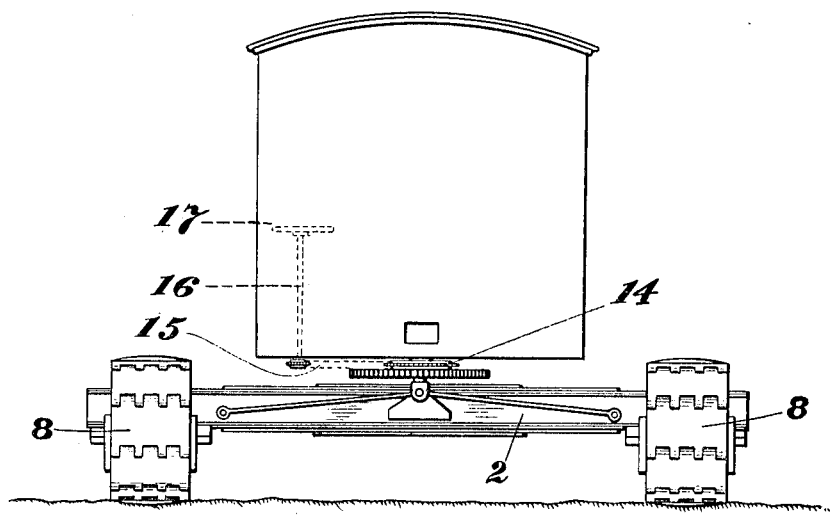
Witnesses:
Louis Arsene Désy,
Inventor
By: Marion & Marion
Attorneys

L. A. DÉSY.
EXCAVATOR.
APPLICATION FILED JUNE 3, 1908. RENEWED JULY 9, 1909.

949,354.

Patented Feb. 15, 1910.

5 SHEETS—SHEET 3.

Witnesses.
L. A. Gauvin
C. Facomprez

Louis Arsène Désy, Inventor,
By: Marion & Marion
Attorneys.

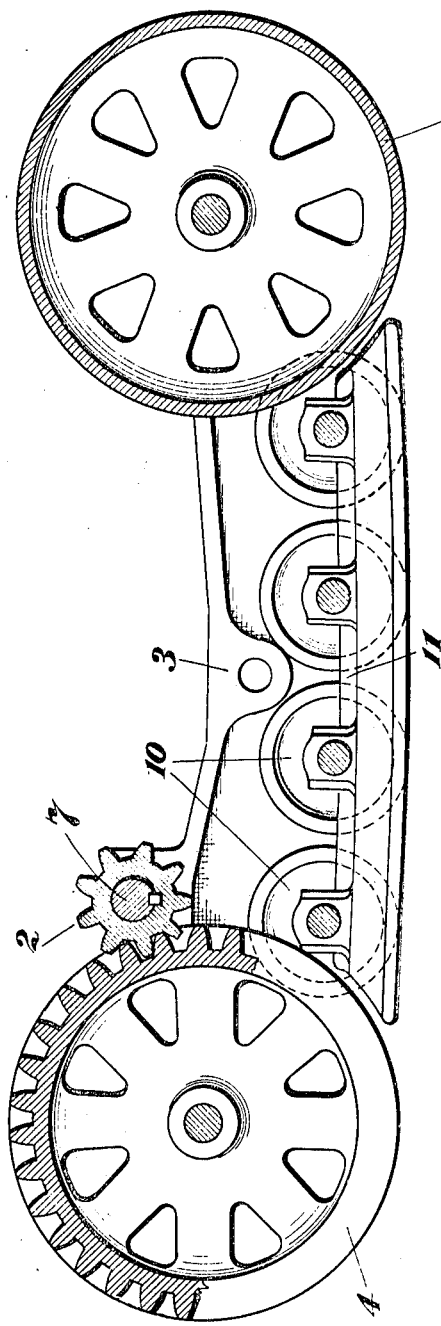
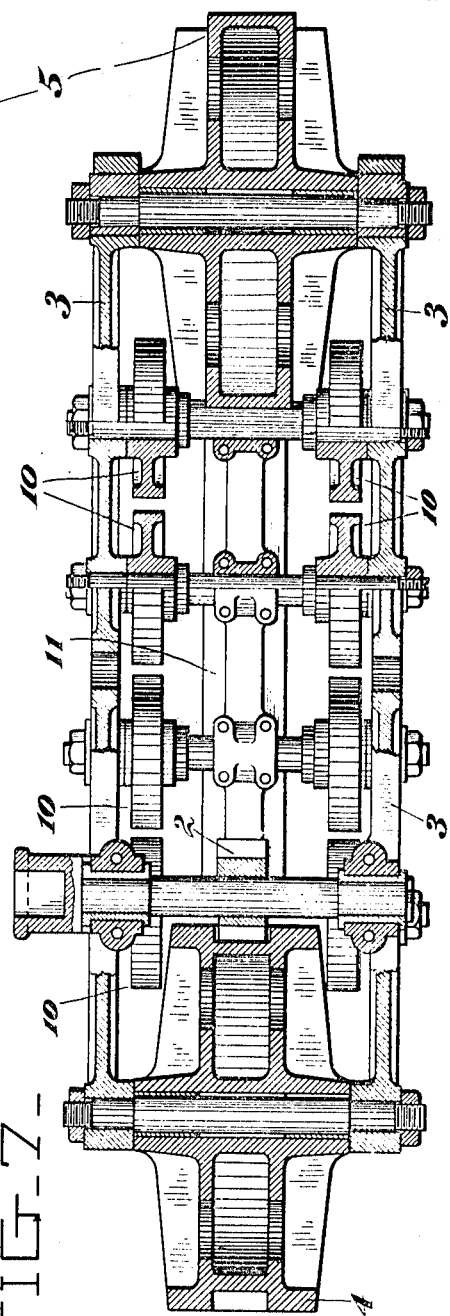

L. A. DÉSY.
EXCAVATOR.
APPLICATION FILED JUNE 3, 1908. RENEWED JULY 9, 1909.
949,354.
Patented Feb. 15, 1910.
5 SHEETS—SHEET 5.
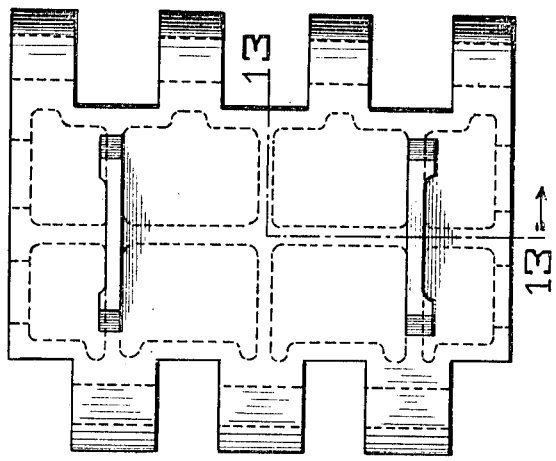
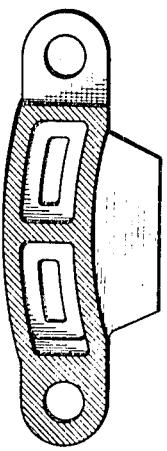
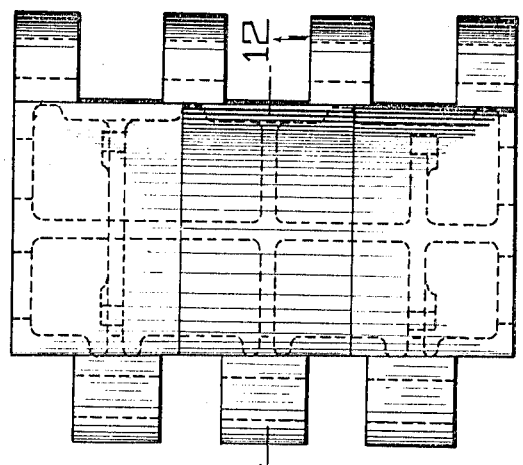
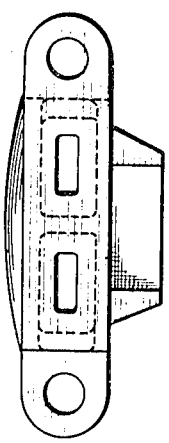
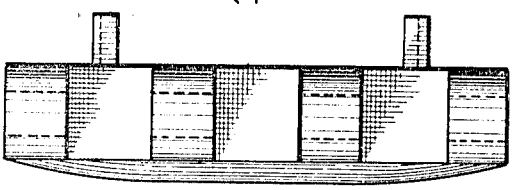
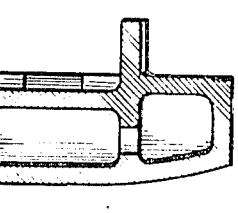
Witnesses:
Louis Arsene Désy
Inventor,
By
Attorneys

UNITED STATES PATENT OFFICE.

LOUIS ARSENE DÉSY, OF MONTREAL, QUEBEC, CANADA.

EXCAVATOR.

949,354.  Specification of Letters Patent.  Patented Feb. 15, 1910.

Application filed June 3, 1908, Serial No. 436,477. Renewed July 9, 1909. Serial No. 506,830.

*To all whom it may concern:*

Be it known that I, LOUIS ARSENE DÉSY, a subject of the King of Great Britain, residing in the city and district of Montreal, Province of Quebec, Canada, have invented certain new and useful Improvements in Excavators; and I do hereby declare that the following is a full, clear, and exact description of the invention, such as will enable others skilled in the art to which it appertains to make and use the same.

The invention to be hereinafter described relates to steam shovels and similar excavating machines, and particularly to a combined means for transporting the machine and steadying or balancing it while in operation. Machines of this kind are exceedingly heavy, very large, and consequently, as now constructed, unwieldly. Due to their size they require a very broad supporting base. Their great weight renders it impossible to mount them on traction wheels because the wheels would be forced so deeply into the road surface as to render them not only useless but objectionable as obstructions. Likewise their bulk and size, necessitating a broad support, render it impossible to mount them on railway tracks without the use of jack screws or other side braces to keep the machines from becoming overbalanced during operation, as the derrick and shovel beam are worked on one side or the other. Consequently, as a choice of the lesser of two evils, the machines have been uniformly constructed with narrow supporting bases which may be mounted on railway tracks and so moved from point to point along the road, jack screws or other side braces being brought into use when the machine was to be operated, in order to prevent the machine being overturned or forced from the track.

It is to overcome this serious objection and to provide a machine which may travel by its own tractive power, wherever desired and over any ordinary road bed, that the present invention has been designed.

In order to enable one skilled in the art to which the present invention relates, to the more readily understand the construction, operation and use of the same, reference should be had to the accompanying drawings forming part of the present application. Throughout the several views of the drawings like reference characters designate the same parts.

Figure 5:
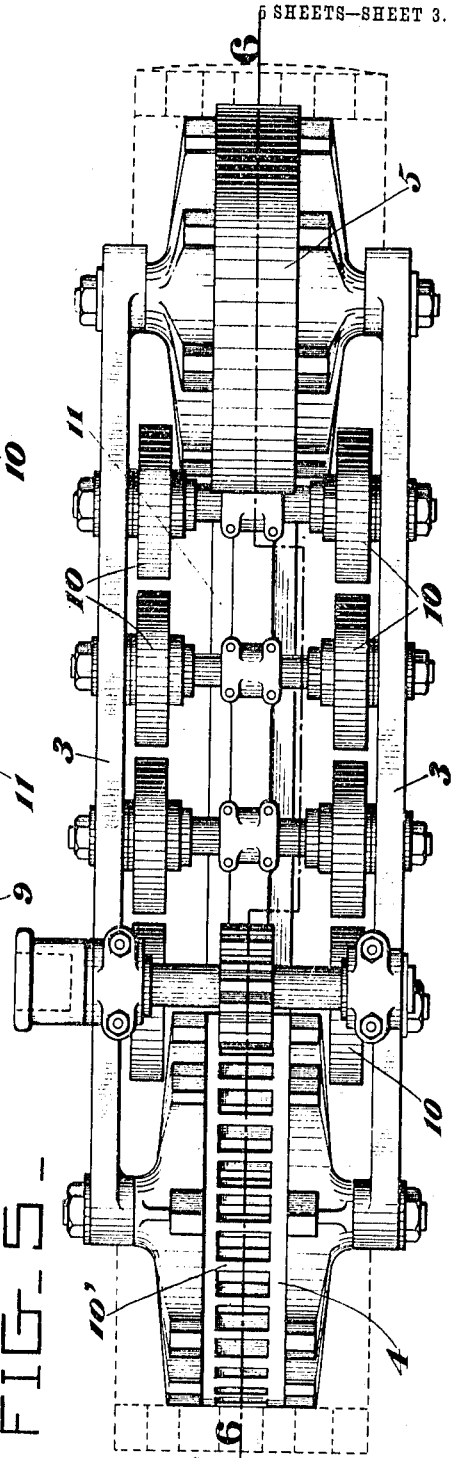

In the drawings: Figure 1 is a side elevation of the machine with the shovel and derrick omitted; Fig. 2 is a front view of the same, showing in dotted lines a railway track and wheels, as the machines are at present supported; Fig. 3 is a rear view, showing the steering mechanism; Fig. 4 is a side elevation of one of the traction devices, detached; Fig. 5 is a plan view of Fig. 4; Fig. 6 is a vertical section on line 6—6 of Fig. 5; Fig. 7 is a horizontal section on line 7—7 of Fig. 4; Fig. 8 is a bottom plan view of one of the drive links detached; Fig. 9 is a top plan view of the same; Fig. 10 is an edge view of Fig. 9; Fig. 11 is a right hand end view of Fig. 9; Fig. 12 is a cross section on line 12—12 of Fig. 8, looking in the direction of the arrow; and, Fig. 13 is a cross section on line 13—13 of Fig. 9, looking in the direction of the arrow.

A broad substantial framework 1 of channel beams or the like is provided and extends the full length and width of the entire machine. At the forward end of this frame is revolubly mounted, in any suitable manner, a well known form of steam shovel excavator or the like. Of course, when the shovel is to be operated at one side of the machine the center of gravity of the forward end of the frame 1 and the parts of the machinery thereon, will be greatly changed and there will be a tendency toward overbalancing of the frame and consequent overturning of the machine. In order to avoid this, heavy cross beams or girders 2 are secured to the framework 1 and extend laterally across beneath the forward end of the frame at the point where the greatest strain will be exerted while the shovel operates at one or other of the two sides of the machine. These cross beams 2 are extended a considerable distance out beyond the opposite sides of the frame 1, as clearly shown in Figs. 2 and 3. The whole machine is supported on traction devices carried at the outer ends of the beams 2 at the front of the machine and similar means at the rear of the machine, all of which will be later described. Thus it will be seen that the leverage between the outer ends of beams 2, where the supports are carried, and at the center of the forward part of the machine frame 1, will be fully equivalent to the counter force exerted by the operation of the shovel at the side of the machine, under all practicable working conditions. It follows of course that all jack screws and other side braces of whatever nature are avoided and unnecessary. Of course, where such a broad and well balanced support is used it is not convenient to mount the machine on the narrow tracks of a railway. Also it is not possible, due to the great weight of the machine, to mount it on vehicle wheels of known construction. Consequently, a novel form of traction means has been designed to meet the particular requirements of the case. This traction means comprises pairs of bolster beams 3 pivotally suspended from the ends of the cross beams 2. Between these bolster beams are journaled, at opposite ends, a drive wheel 4 and a guide wheel 5. The drive wheel 4 is provided with gear teeth adapted to mesh with and be driven by a pinion 6 fixed to a power shaft 7 which may be driven by any suitable and well known form of connections between it and the engine of the machine. Over the wheels 4 and 5 a broad traction chain 8 is passed. This chain consists of very broad links flexibly connected and provided on their inner faces with parallel flanges 9 which fit into sockets 10' in the drive wheel 4. Thus, as the wheel 4 is driven, the traction chain 8 will pass about the wheels 4 and 5. Due to the flexible connections, the portion of the chain in engagement with the road surface tends to yield to the contour of the road bed and consequently the portion between the wheels 4 and 5 will not get such firm hold on the road bed as desired, unless braced or held rigidly against deflection. To this end the bolster beams 3 are provided with a plurality of pressure rollers 10 which bear upon the inner face of the lower run of the traction chain 3 and thus hold it solidly in engagement with the road surface, insuring a perfect driving grip. It will be evident on reference to the drawings that this particular form of traction means provides a very extensive driving surface particularly valuable for use on soft yielding surfaces.

In order to prevent the entrance of gravel or dirt between the adjoining links of the chain and consequent injury, guard plates or shoes 11 are provided. These plates are suspended from the axles of the rollers 10, in such position as to extend from the wheels 4 to the wheels 5 and to lie in sliding contact with the inner face of the traction chain 8, the flanges 9 of the several links passing along opposite edges of the shoe or guard, and thus guiding the lower end of the chain as it passes from one wheel toward the other. Thus it will be seen that the guard plate performs three duties,—first, it prevents entrance of gravel and other injurious substances to the links of the chain; second, it coöperates with the link flanges 9 to guide the chain; and, third, it acts as a brace to aid the roller 10 in retaining the lower run of the chain in solid gripping position.

On reference to Fig. 1 it will be noticed that the drive shafts 7 are mounted to one side of the center of oscillation of the bolster beams 3. Consequently, as the beams oscillate the shafts will be rocked up and down. In order to allow such rocking motion and at the same time maintain the mesh of all driving gears, the shafts are provided with any well known form of flexible joints near their opposite ends.

Of course, as the machine turns curves in the road the outer traction chain will necessarily need to travel considerably faster than the inner traction chain. To this end any well known form of compensating gear may be used between the main driving gear or pulley 12 and the coöperating gears 13 on the inner ends of the drive shafts 7.

The cross beam 2 for supporting the rear of the machine frame is pivotally connected to the center thereof, so that the rear traction device may be swung about such pivot to steer the machine. Any well known means of steering mechanism may be used. As shown in the drawings it comprises a pulley 14 fixed to the pivot of the rear cross beam 2 and adapted to be rotated by means of the friction belt 15 driven from a similar pulley on the lower end of the steering rod 16 operated by any well known form of hand wheel 17.

It is thought that the operation and use of the invention will be clear from the preceding detailed description.

Many changes may be made in the construction of the several parts of the machine, many rearrangements of these parts, many substitutions for them and many other combinations of them, without in any way departing from the field and scope of the present invention, and it is meant to include all such within this application, wherein only a preferred form has been shown and described.

Having thus fully described my invention, what I claim as new and desire to secure by Letters Patent is:

1. An excavator support comprising a frame adapted to support the working parts of the excavator, and cross beams rigidly secured to the frame, said beams extending laterally across the frame and projecting beyond the edges of the frame.

2. An excavator support comprising, a frame adapted to support the working parts of the excavator, cross beams rigidly secured to the frame and extending laterally across the same, and traction means mounted on said cross beams.

3. An excavator support comprising, a frame adapted to support the working parts of the excavator, cross beams rigidly secured to the frame, said beams extending laterally across the frame and projecting beyond the edges of the frame, and traction means on the ends of said cross beams.

4. An excavator support comprising, a frame adapted to support the working parts of the excavator, cross beams rigidly secured to the frame and extending laterally across the same, and traction means pivotally mounted on said cross beams.

5. An excavator support comprising, a frame adapted to support the working parts of the excavator, cross beams rigidly secured to the frame and extending laterally across the same, traction means mounted on said cross beams, and means for maintaining said traction means in operative position.

6. An excavator support comprising, a frame adapted to support the working parts of the excavator, cross beams rigidly secured to the frame and extending laterally across the same, traction means mounted on said cross beams, and means for preventing the entrance of injurious substances into the traction means.

In witness whereof I have hereunto set my hand in the presence of two witnesses.

LOUIS ARSENE DÉSY.

Witnesses:
W. S. BABCOCK,
C. FACOMPREZ.